United States Patent
Tong et al.

(10) Patent No.: US 11,621,771 B1
(45) Date of Patent: Apr. 4, 2023

(54) SATELLITE PAYLOAD WITH FULL DOWNLINK SPECTRUM USAGE

(71) Applicant: Asia Satellite Telecommunications Company Limited, New Territory (HK)

(72) Inventors: Roger Shun Hong Tong, New Territory (HK); Harry Yin Chung Leung, New Territory (HK); Hai Hu, New Territory (HK)

(73) Assignee: ASIA SATELLITE TELECOMMUNICATIONS COMPANY LIMITED, New Territory (HK)

( * ) Notice: Subject to any disclaimer, the term of this patent is extended or adjusted under 35 U.S.C. 154(b) by 0 days.

(21) Appl. No.: 17/504,178

(22) Filed: Oct. 18, 2021

(51) Int. Cl.
  *H04B 7/185* (2006.01)
  *H04L 27/26* (2006.01)
(52) U.S. Cl.
  CPC ..... *H04B 7/18526* (2013.01); *H04B 7/18519* (2013.01); *H04L 27/2666* (2013.01)

(58) Field of Classification Search
  CPC ............ H04B 7/18526; H04B 7/19519; H04L 27/2666
  See application file for complete search history.

(56) References Cited

U.S. PATENT DOCUMENTS

| | | | |
|---|---|---|---|
| 10,291,315 B1* | 5/2019 | Tong | H04W 16/28 |
| 2019/0363803 A1* | 11/2019 | Tong | H04B 7/1851 |
| 2020/0177272 A1* | 6/2020 | Gedmark | H04B 7/2041 |

* cited by examiner

*Primary Examiner* — Jaison Joseph
(74) *Attorney, Agent, or Firm* — Hanley, Flight & Zimmerman, LLC

(57) ABSTRACT

Satellite communication methods and payloads are described. The payload and methods are designed to enable effective use of carrier signals in the guard band region of a channelized band of spectrum. An on-board digital channelizer may implement a band edge power monitor for measuring power spectral density in the band edges of a channel and, if it exceeds a preset threshold level, downscaling the signal amplitude in the band edges to prevent hardware damage to the payload. The channelizer may further implement a band edge gain adjustment filter for shaping the overall frequency response to flatten the response across adjacent channels, including through the guard band region between the passbands of the adjacent channels.

20 Claims, 11 Drawing Sheets

SATELLITE PAYLOAD WITH FULL DOWNLINK SPECTRUM USAGE

TECHNICAL FIELD

The present application relates to satellite communications, and more particularly to methods and systems for improving spectrum utilization in satellite communications.

BACKGROUND

Conventional analog satellite architecture has proven reliable in routing RF communications between grounds stations. The conventional architecture channelized uplink spectrum using an input multiplexer, amplifies the individual channels, and combines the amplified channels using a passive output multiplexer (OMUX). The standard frequency plan provides for guard bands between adjacent channels that consume about 10% of the spectrum.

Various attempts to improve the efficiency of spectrum usage by reclaiming or eliminating the guard bands have been attempted. However, some proposed solutions are too bulky, expensive, and/or difficult to implement. Among the problems with sending traffic in the guard bands is the OMUX channel filters with significant roll-offs over the band edges of a channel that make up the guard bands result in dissipated power at the OMUX and reflected power back toward the high-power amplifiers (HPAs). This can result in hardware damage to both the OMUX and the HPAs. It would be advantageous to provide for a cost-effective and implementable solution that addresses these risks at least in part.

BRIEF DESCRIPTION OF THE DRAWINGS

Reference will now be made, by way of example, to the accompanying drawings which show example embodiments of the present disclosure, and in which.

Like reference numerals are used in the drawings to denote like elements and features.

DETAILED DESCRIPTION

Figure 1:
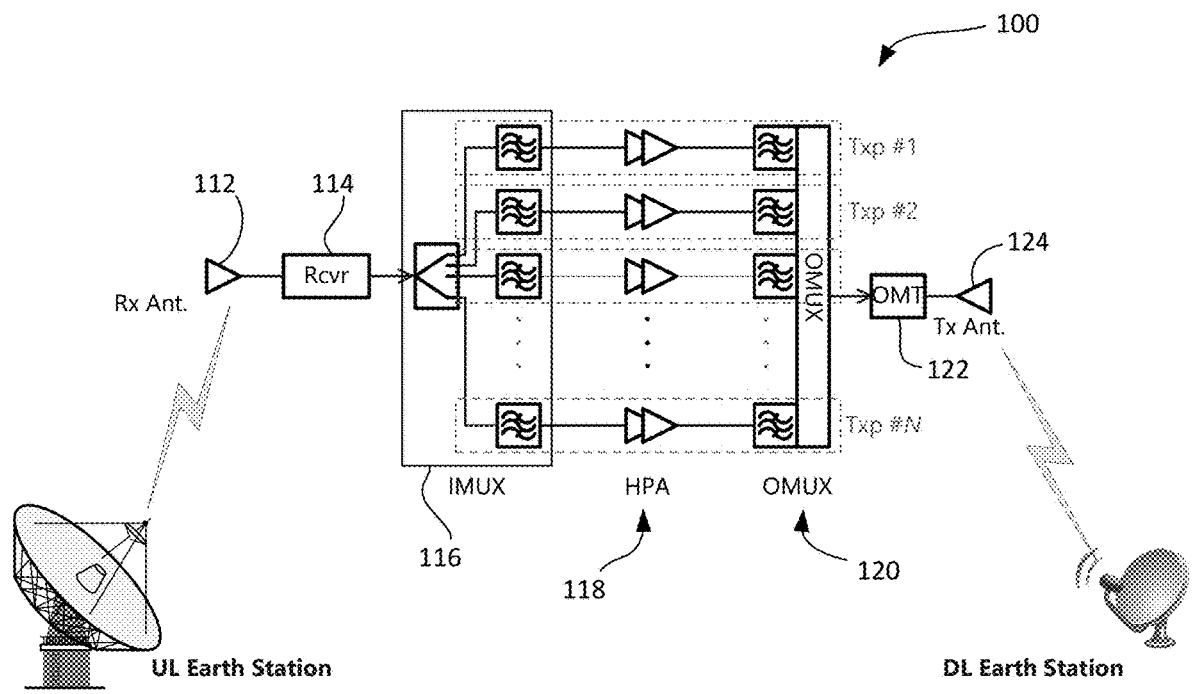
FIG. 1 is a block diagram of an example of a conventional analog satellite payload.

In one aspect, the present application describes a satellite payload. The satellite payload includes a receive antenna to receive an uplink band of spectrum; a digital channelizing processor to digitize the uplink band of spectrum to produce a digitized band of spectrum, to channelize the digitized band of spectrum into a plurality of subchannels, to switch and route the subchannels, to select, combine and filter the subchannels to form a plurality of individual channels using a digital input demultiplexer, and to output analog channels; a high-power amplifier for each of the analog channels to generate amplified channels; an output multiplexer that includes, for each amplified channel, an output multiplexer channel filter having a channel bandwidth that includes a pass band and a band edge on either side of the pass band, whereby adjacent band edges of adjacent channels form a guard band between the pass bands of those adjacent channels, the output multiplexer outputting a downlink band of spectrum; and a transmit antenna to transmit the downlink band of spectrum. The digital channelizing processor includes, for each of at least one of the plurality of channels, a band edge power monitor to measure power spectral density in the band edges of that channel and to scale down signal amplitude within the band edges when the measured power spectral density in the band edges exceeds a threshold level power spectral density.

In some implementations, the band edge power monitor is further to partition the digitized band of spectrum within that channel into a plurality of resolution bands of the channel bandwidth, measure power in each of the resolution bands of the channel bandwidth, and determine power spectral density in the band edges based on the measured power in the resolution bands of the channel bandwidth in the band edges. In some cases, the band edge power monitor is to determine power spectral density in the band edges by integrating and averaging the measured power in the resolution bands of the channel bandwidth in the band edges.

In some implementations, the digital channelizing processor further includes a memory storing the threshold level power spectral density.

In some implementations, the band edge power monitor is to scale down signal amplitude by determining a scaling factor and using the scaling factor to scale the signal amplitude in a digital domain. In some cases, the band edge power monitor is to determine the scaling factor based on a ratio of power spectral density in the band edges to the threshold level power spectral density.

In some implementations, the digital channelizing processor further includes, for the each of at least one of the channels, a band edge gain adjustment filter having a frequency response configured to compensate for a frequency response of a channel path through the input demultiplexer, high-power amplifier and the output multiplexer on that channel, such that an output frequency response across the adjacent channels is substantially flat. In some cases, the output multiplexer further includes one or more temperature sensors coupled to the digital channelizing processor to provide a temperature signal representing output multiplexer channel filter temperature, and the digital channelizing processor is configured to select, for each of at least one of the channels, based on the temperature signal, a respective set of filter coefficients from among two or more respective sets of stored filter coefficients for that channel, and to configure the band edge gain adjustment filter for that channel using the selected respective set of filter coefficients.

In some cases, the output multiplexer further includes one or more temperature sensors coupled to the digital channelizing processor to provide a temperature signal representing output multiplexer channel filter temperature, and the digital channelizing processor is configured to compare the temperature signal to a temperature range associated with a current set of filter coefficients used by the band edge adjustment filter and, when the temperature signal is outside the temperature range, to select and apply a different set of filter coefficients associated with the channel.

In some cases, the digital channelizing processor includes a memory storing current filter coefficients for realizing the frequency response and wherein the digital channelizing processor is configured to retrieve the current filter coefficients and to use them to generate the band edge adjustment filter.

In another aspect, the present application provides a method of managing satellite communications. The method may include receiving an uplink band of spectrum at a satellite payload; digitizing the uplink band of spectrum to produce a digitized band of spectrum; channelizing the digitized band of spectrum into a plurality of subchannels using a digital channelizer; routing and switching the subchannels; selecting, combining and filtering the subchannels to form a plurality of individual channels using a digital input demultiplexer; converting the plurality of channels into analog channels; amplifying each of the analog channels using a respective high-power amplifier to generate amplified channels; multiplexing the amplified channels to produce a downlink band of spectrum using an output multiplexer that includes, for each channel, an output multiplexer channel filter having a channel bandwidth that includes a pass band and a band edge on either side of the pass band, whereby adjacent band edges of adjacent channels form a guard band between the pass bands of those adjacent channels; transmitting the downlink band of spectrum to an earth station; and after the channelizing and prior to the converting, for at least one of the channels, measuring power spectral density in the band edges of that channel and scaling down signal amplitude within the band edges when the measured power spectral density in the band edges exceeds a threshold level power spectral density.

Other example embodiments of the present disclosure will be apparent to those of ordinary skill in the art from a review of the following detailed description in conjunction with the drawings.

Example embodiments of the present disclosure are not limited to any particular type of satellite or antenna.

Satellite Overview

Satellites are devices positioned in orbital space that are used for various purposes. In one example embodiment, the satellites are communication satellites. That is, they are positioned in orbital space for the purpose of providing communications. For example, communication satellites are designed to relay communication signals between two end-points (which may be stationary or mobile) to provide communication services such as telephone, television, radio and/or internet services.

The satellites may employ a variety of orbital paths around the Earth. For example, satellites may have geostationary orbits, molniya orbits, elliptical orbits, polar and non-polar Earth orbits, etc. Communication satellites typically have geostationary orbits. That is, the satellites have a circular orbit above the Earth's equator and follow the direction of the Earth's rotation. A satellite in such an orbit has an orbital period equal to the Earth's rotational period, and accordingly may appear at a fixed position in the sky for ground stations.

In order to perform communication functions, the satellite is equipped with various components. For example, the satellite may include a communication payload (which may further include transponders, one or more antennas, and switching systems), engines (to bring the satellite to the desired orbit), tracking and stabilization systems (used to the orient the satellite and to keep the satellite in the right orbit), power subsystems (to power the satellite) and command and control subsystems (to maintain communication with ground control stations).

The transponder of the satellite forms a communication channel between two end-points to allow for communications between the two end-points. The transponder also defines the capacity of the satellite for communications.

The antenna of the satellite transmits and receives communication signals. More specifically, the antenna is an electronic component that converts electric currents (which may be generated by a transmitter) to propagating radio frequency (RF) signals during transmission, and converts induced RF signals to electric currents during reception. In at least some example embodiments, the antenna may be associated with an amplifier which may amplify the power of the transmitted or received RF signals. The satellite may have separate receive and transmit antennas.

The communication signals may be microwave signals. Microwave signals are RF signals that have wavelengths ranging from as long as one meter to as short as one millimeter. Equivalently, the frequency of the RF signals may range from 300 MHz to 300 GHz. More particularly, the communication signals are within certain frequency bands of microwave signals as they are more suited for satellite communications. For example, in at least some example embodiments, a satellite may operate within the frequency of the C-band defined by the ITU. The C-band is a portion of the electromagnetic spectrum that ranges from approximately 4 GHz to 8 GHz. That is, the communication signals are transmitted by and received at the satellite within such a frequency range.

In some cases, the satellite may operate within frequencies higher than 8 GHz. For example, the satellite may operate within the frequency of the Ku-band. The Ku-band is the portion of the electromagnetic spectrum that ranges from approximately 10 GHz to 18 GHz.

In at least some example embodiments, the satellite may operate within other high frequencies, above the Ku-band. For example, the satellite may operate within the Ka-band frequency. The Ka-band is the portion of the electromagnetic spectrum that ranges from approximately 26.5 GHz to 40

GHz (at present the assigned slots for fixed satellite service (FSS) are 27-31 GHz for uplink and 17.7-21.2 GHz for downlink).

In some examples, the satellite may be configured to operate in more than one band. In one example, the satellite may be equipped to receive and transmit signals within the C-band, Ku-band, and Ka-band.

It will be appreciated that the satellites may operate within other microwave frequency bands. For example, the satellites may operate in any one of the defined microwave frequency bands ranging in frequencies from approximately 1 GHz to 170 GHz. Examples of such frequency bands may include the X-band, etc.

A conventional analog payload architecture is illustrated in FIG. 1 by way of a block diagram of an example satellite payload 100. The payload 100 includes a receive antenna 112, such as a reflector antenna, which collects incoming RF signal. A receiver 114 connected to the receive antenna 112 amplifies the induced signal using a low noise amplifier and the amplified signal is down-converted to the desired downlink frequency band. The downconverted signal is then channelized by an input demultiplexer 116 (IMUX) so as to map individual analog uplink channels to their corresponding downlink channels in accordance with a predefined and fixed frequency plan. Each channel is then amplified using individual high power amplifiers (HPAs) 118, such as linearized travelling wave tube amplifiers (LTWTA). The output from the HPAs 118 are then combined again by an output multiplexer 120 (OMUX) and fed to a transmit antenna 124 for transmission back to the Earth. An orthomode transducer (OMT) 122 may be used in implementations in which two orthogonally polarized signal paths need to be combined before sending to the transmit antenna 124.

The channelized payload design can achieve high downlink power spectrum density (PSD), channel-to-adjacent-channel interference ratio, and carry the desired communication traffic between the uplink and downlink satellite earth stations.

Figure 2:
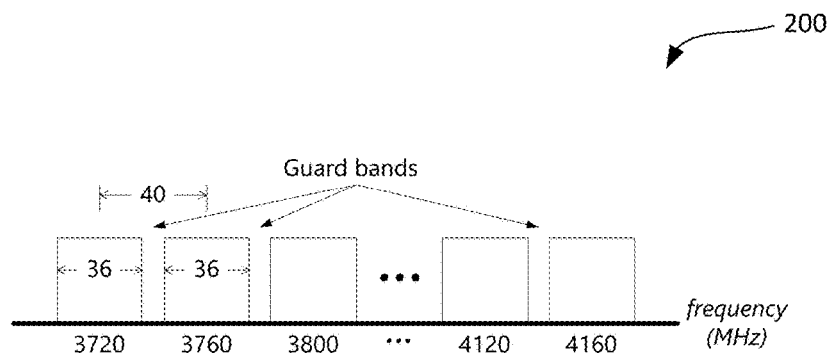
FIG. 2 illustrates a typical C-band frequency plan for an analog satellite.

The frequency MUXs onboard a conventional satellite payload are commonly realized by analog RF channel filter banks with flat in-band insertion response and sharp out-of-band rejection response. In between the adjacent channel filters, guard bands of about 10% of channel bandwidth (BW) are typically left to separate the channels. FIG. 2 illustrates a typical C-band frequency plan 200 for an analog satellite. The channel separation, i.e. separation between centerpoints of adjacent channels, is 40 MHz. However, the usable bandwidth of the channel, i.e. the pass band, is only about 36 MHz and the unused 4 MHz between adjacent pass bands serves as a guard band. Accordingly, about 10% of the downlink bandwidth is wasted by serving as guard bands.

It would improve the capacity of a general bent-pipe satellite communication system if the guard bands were available for sending communications traffic. In order to meet demand for higher throughput, most satellite manufacturers and operators' have been instead turning to higher frequency bands (e.g. Ka, Q and V bands) and/or integrating more advanced payloads in a high throughput satellite (HTS) with hundreds to thousands of small spot beams. Nevertheless there have been some attempts to try to use or eliminate the guard bands for data communications.

Both the IMUX and OMUX channel filters are typically realized by advanced dielectric resonator or waveguide cavity filter technologies. The IMUX handles low power received signals and thus can be realized by high-order, self-equalized, compact-profiled microwave band-pass filters (BPF), while the OMUX handles high power transmit signals and therefore is usually built using low-order, low-loss and relatively bulky microwave BPFs. The hybrid-branching IMUX design can realize a usable channel bandwidth as wide as nearly the channel separation. However, for the low-loss manifold-coupled contiguous OMUX, its usable channel bandwidth is confined to the relatively flat inner 90% channel bandwidth while the 10% outer bandwidth is left as guard band to account for the interactions between adjacent channels, i.e. the sharp out-of-band rejection roll-off skirts of each channel If RF carriers are put in the guard bands of an analog bent-pipe payload, several risks arise. First, the carriers see significant power loss in the guard band region. That power loss is both heat dissipation absorbed at the OMUX and reflected power that reflects back to the HPAs. The heat dissipation can cause overheating of the OMUX, which changes its characteristics and can result in damage. Likewise, the reflected power back to the HPAs can result in hardware damage to the HPAs. Second, the power loss and carrier distortion means that the received signal at the ground station may be significantly attenuated and distorted to the point that its signal-to-noise ratio (SNR) and/or modulation-error ratio (MER) is too high. Third, there are multi-path effects between adjacent transponder paths, i.e. the same carrier may go into two different transponders that have slightly different electrical lengths and hence different propagation time delays before being combined by the OMUX, resulting in some degree of interference. Even if usable, it may limit the satellite operator's ability to switch traffic to carriers in the guard band since customers may object to their traffic being routed over a guard band channel with a higher error rate.

Some attempts to overcome these obstacles so as to use the guard bands have been tried. For example, a power bank payload has been proposed, although it rarely finds commercial use since all HPAs must operate in back off mode, reducing power spectrum density of the outgoing signal; it has a bulky and complex analog RF design requiring high precision machining; and it requires complex HPA redundancy since a single HPA failure disrupts the full set of paths. Digital beamforming payloads have also been proposed, but designing and manufacturing a space-qualified active phased array antenna system that matches the RF performance of conventional analog is very difficult and costly. Most digital beamforming focusses on high frequency spot beam implementations, since they require smaller components.

In U.S. Pat. No. 10,050,698, the present applicant described a satellite payload system designed to use the guard bands. The system used a digital channelizing processor (DCP) to channelize and route uplink guard bands of other satellite communications bands, like C and Ka, to an unused portion of the extended-Ku downlink band. The payload proposed in this system involved adding an additional OMUX. While this system has its advantages, it will be appreciated that some embodiments require the overhead of an additional hardware OMUX, which is one of the bulkiest components of the satellite payload, and two OMUX's serving the same band and same polarization require two transmit antennas, which may not be feasible for C-band communications.

It would be advantageous to provide for a solution that enables recovery and use of the guard band spectrum for downlink communications, without some of the drawback of existing solutions. The present application provides such a solution. As will be described below, in some aspects, the present application describes a satellite payload that uses the DCP for input signal processing and channelization, which provides full flexibility in dynamically routing and mapping individual subchannels to defined channel paths in the payload. The system retains the efficient powerful analog OMUX design of conventional analog payloads, but uses the DCP to enable routing of some subchannels to one or more of the guard bands through the use of a BE power monitoring and control module within the DCP to measure the power spectrum density (PSD) in the guard bands and to scale down signals based on comparison of the measured PSD with a threshold PSD set to prevent damage to the OMUX and/or the HPAs. In some implementations, the DCP further implements a band-edge (BE) gain adjustment module that is designed to flatten the frequency response across adjacent channels such that the RF carriers placed in the guard bands are not significantly attenuated or distorted relative to carriers in the pass bands.

Figure 3:
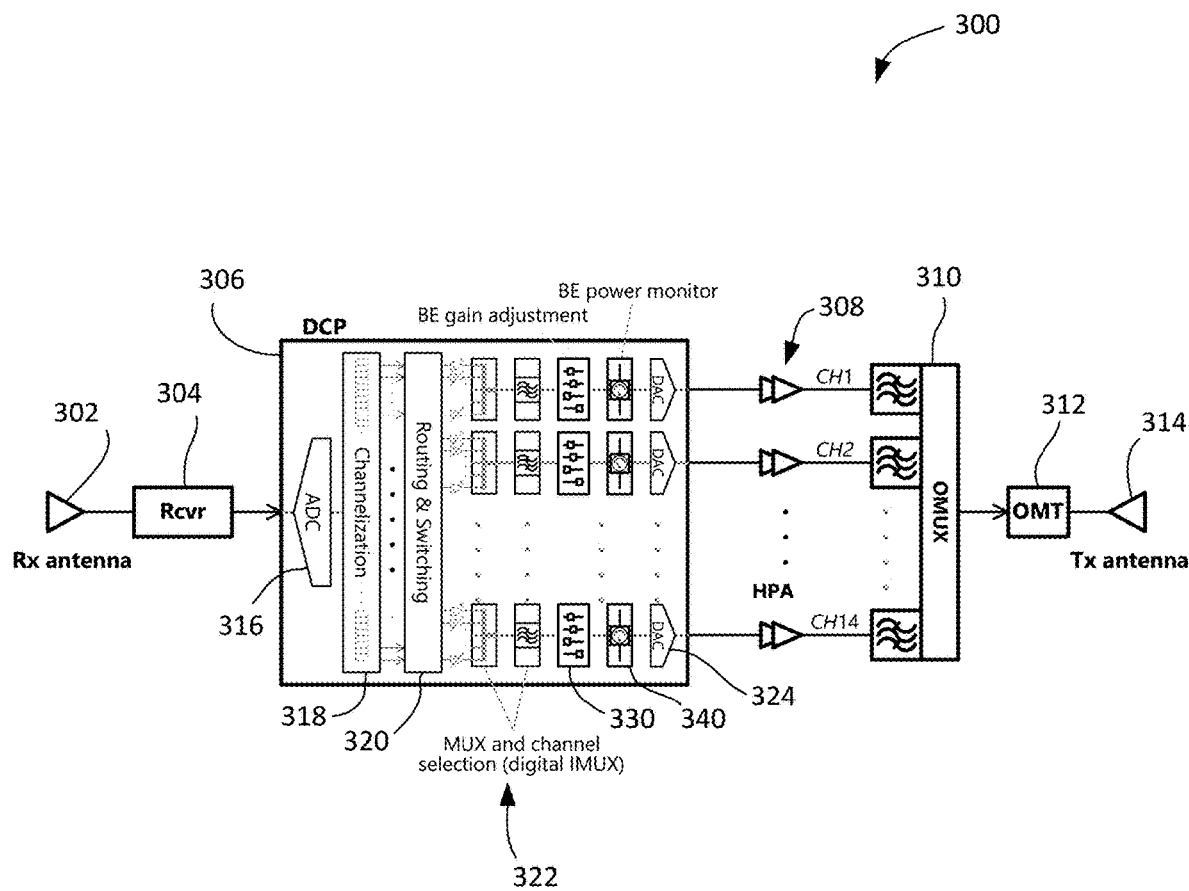
FIG. 3 shows in block diagram form one example of a satellite payload.

Reference is now made to FIG. 3, which shows in block diagram form one example of a satellite payload 300. The payload 300 includes a receive antenna 302, a receiver 304, a DCP 306, a set of HPAs 308, an analog OMUX 310, an OMT 312, and a transmit antenna 314. The receiver 304 may include amplification, filtering, and/or frequency conversion components. The OMUX 310 is a passive device with multiple input ports and one output port used to combine multiple frequency-separated high power RF channels into one single output path that leads to the transmit antenna 314 for downlink. The OMUX 310 in this example employs a contiguous channel layout configuration, where the passband of adjacent channels are almost contiguous to each other, except for about a 10% guard band between adjacent channels to accommodate the rejection roll-offs between OMUX channel filters.

Implemented within the DCP 306, in this example, is one or more analog-to-digital converters (ADC) 316 that convert the received signals into digital form. In particular, the ADC 316 digitizes the received spectrum. It is then subject to channelization by a channelization module 318 to separate the digitized spectrum into a plurality of subchannels each having a bandwidth resolution as fine as several hundred KHz to a few MHz. The digital-channelized input signals are then routed to desired output branches by a routing and switching module 320. In the output branches, the desired subchannels are selected, combined, filtered by a digital IMUX 322 to form individual channels in accordance with the frequency plan, and are routed to respective digital-to-analog converters (DAC) 324 at the output of the DCP 306. Since all spectrum is processed in the digital domain, the DCP 306 can be equipped with various software-defined tools for spectrum analysis, carrier monitoring and control operations which used to be only performed at the ground control center.

The payload 300 further includes, implemented within the DCP 306 in this example, one or more BE gain adjustment filter banks 330 and one or more BE power monitors 340.

The BE gain adjustment filter banks 330 impose a frequency response on the spectrum for their respective channels that is selected so as to smooth out the overall frequency response of the system across the pass bands and guard bands. In this regard, it may be appreciated that BE gain adjustment filter banks 330 for two adjacent channels cooperatively filter their respective channels so as to result in a relatively flat frequency response across the frequency bands of the two channels, including the across the guard band between their pass bands. In some cases, BE gain adjustment filter banks 330 are implemented on each channel in the payload 300. In some cases, BE gain adjustment filter banks 330 are implemented on a subset of the channels in the payload 300.

The BE power monitors 340 measure the power spectral density in the guard bands for a channel That is, the BE power monitor 340 measures the power spectral density in the two band edge portions at either side of a channel's passband. If the power spectral density exceeds a threshold level set for that channel, then the BE power monitor 340 causes a scaling of one or more subchannels in order to reduce the accumulated power in the guard band range. The BE power monitor 340 operates as an intelligent power limiter in the digital domain. Because the BE power monitor 340 operates in the digital domain it can directly measure the carrier power in the band edge regions independent of the power in the pass band region, and can attenuate or scale down individual subchannels rather than bluntly attenuating the entire channel.

The BE power monitors 340 may appear on every channel or on a subset of channels. In some implementations, the DCP 306 includes one BE power monitor module or routine or thread that carries out individual assessments of PSD on each channel being monitored, since, as will be described, each channel may have a characteristic gain value to be accounted for in its determination of a PSD threshold. In some implementations, the DCP 306 includes an dedicated BE power monitor module or routine or thread that carries out the PSD measurement and scaling operations for each channel being monitored.

Band Edge Gain Adjustment

Figure 4:
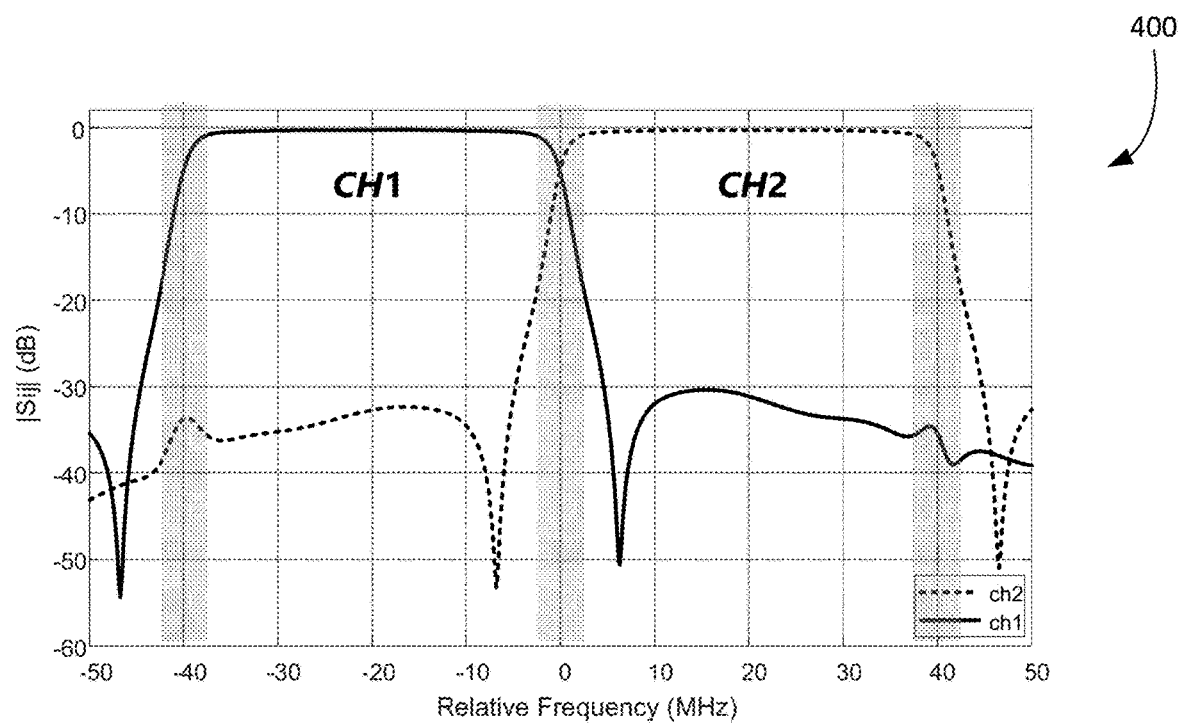
FIG. 4 shows one example graph of channel frequency response through an OMUX for two adjacent channels.

As noted above, one of the challenges to BE carrier operation is channel distortions. Generally, these may include amplitude and group delay linear distortions that are imposed by the passive components along the signal path of the payload. FIG. 4 shows one example graph 400 of channel frequency response through an OMUX for two adjacent channels, CH1 and CH2. In this example, the relative frequency 0 indicates the center of the guard band between the two channels. The channels are 40 MHz each, having midpoints at −20 MHz and +20 MHz, respectively. The pass bands are 36 MHz and each channel has a 2 MHz band edge on either side. Adjacent band edges of the two channels form the guard band between the channels. It will be noted that the OMUX channel filter gain that is relatively flat through the pass band region, but the OMUX channel filter gain drops quickly from the pass band edge to the guard band center.

Figure 5:
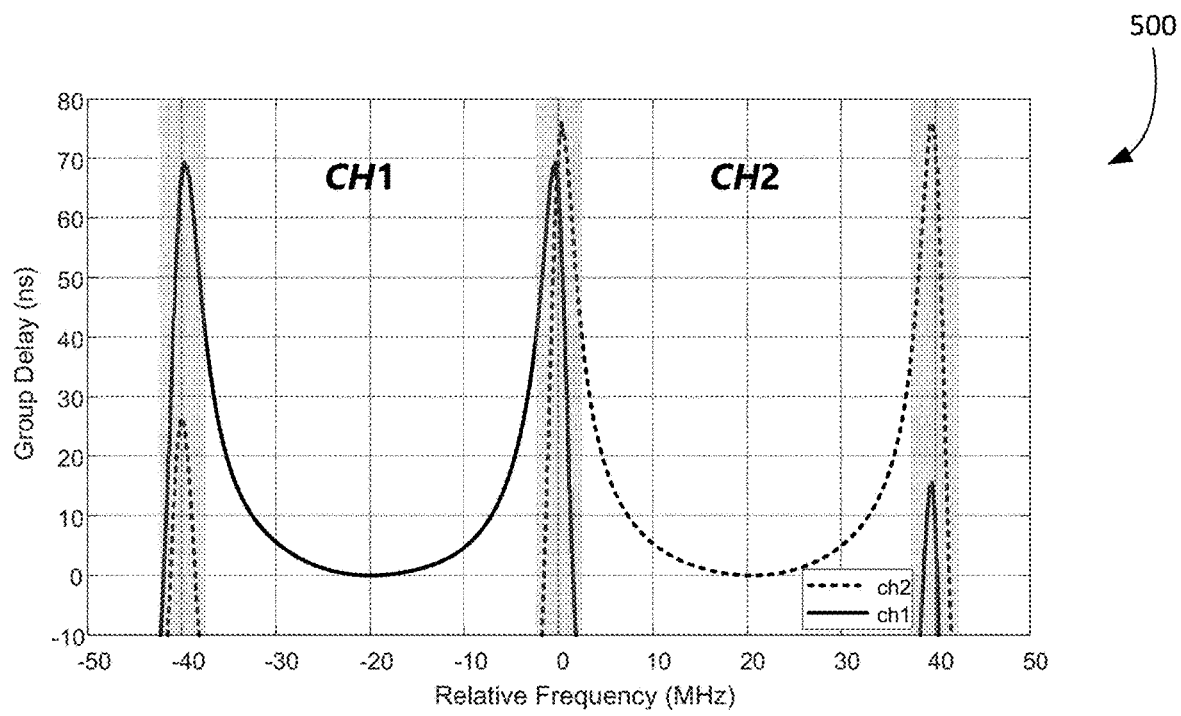
FIG. 5 shows an example graph of group delay characteristic for the same two example channels.

FIG. 5 shows an example graph 500 of group delay characteristic for the same two example channels, CH1 and CH2. The group delay is low and relatively flat in the middle of the passband, but becomes more significant closer to the band edges. Within the band edges the group delay exhibits a significant steep spike. If more than one physical transponder is used to route the same carrier (e.g. a carrier operates in the guard band), a multi-path issue may result which may also contribute to the channel linear distortion.

At the ground station, a receiver may reduce these channel distortions to some degree using a digital equalizer. This is because channel linear distortion is deterministic in nature and will not quickly change with time. Working in the digital time domain, the receiving equalizer can be trained to dynamically learn the real-time characteristics of the receiving communication channel so as to correct the linear distortions by iteratively equalizing the received signal symbols. However, if the random-natured downlink thermal noise has to be accounted for, the amplitude distortion in the guard band range cannot be fully effectively mitigated by using an equalizer. The channel amplitude distortion is due to the OMUX channel filter out-of-band rejection roll-offs which can result in a lowered downlink EIRP at the channel guard band. The downlink noise originates from the receiver thermal noise in a user terminal, and can be relatively high (compared with the carrier power) for small-sized user terminals. If the downlink noise dominates the noise of the entire link, it can significantly lower the receiver carrier-to-noise (C/N) ratio of a carrier operating in the guard band.

Accordingly, while it may be possible to use the guard bands for communications given the digital modulation and coding schemes now in common use and receiver digital equalization, the subchannels in the guard band experience a lower C/N ratio and/or MER, which makes that portion of the spectrum less desirable and/or less acceptable to customers of the satellite operator. The operator may not be free to move subchannels to the guard bands portion of the spectrum because of its lower quality performance relative to subchannels carried in the pass bands.

As noted above, the BE gain adjustment filter bank 330 (also referred to herein as a BE gain adjustment module) may be implemented by the DCP 306 so as to mitigate guard band carrier C/N degradation to a desired level. It works by strategically compensating the gain response in the guard band range so that when the high-power amplified carrier passes though the OMUX it exhibits nearly no power loss relative to the carriers in the pass band. The merit of this module is the resultant guard band carrier's downlink EIRP PSD can be nearly the same as those operating in the passband, which means that carriers can be flexibly allocated to different frequency locations within the entire downlink spectrum without extra consideration of band edge or guard band, which assures homogenous carrier performance for the users and greatly facilitates carrier management work for the capacity providers.

In some implementations, the BE gain adjustment filter bank 330 may be implemented as an infinite impulse response (IIR) filter. In some examples, the BE gain adjustment filter bank 330 may be a complex digital IIR filter. In some examples, the complex digital IIR filter has an order N=20, although in some implementations the filter has a different order.

The IIR filter transfer function coefficients, $A_i$, $B_i$, i.e. the coefficients in the numerator and denominator polynomials, are selected so as to compensate for the BE distortion through the transponder channel They may be selected such that when the IIR filter transfer function and the frequency response at the OMUX without the IIR filter are combined, the resulting frequency response is relatively flat through the pass band and guard bands.

Figure 6A:
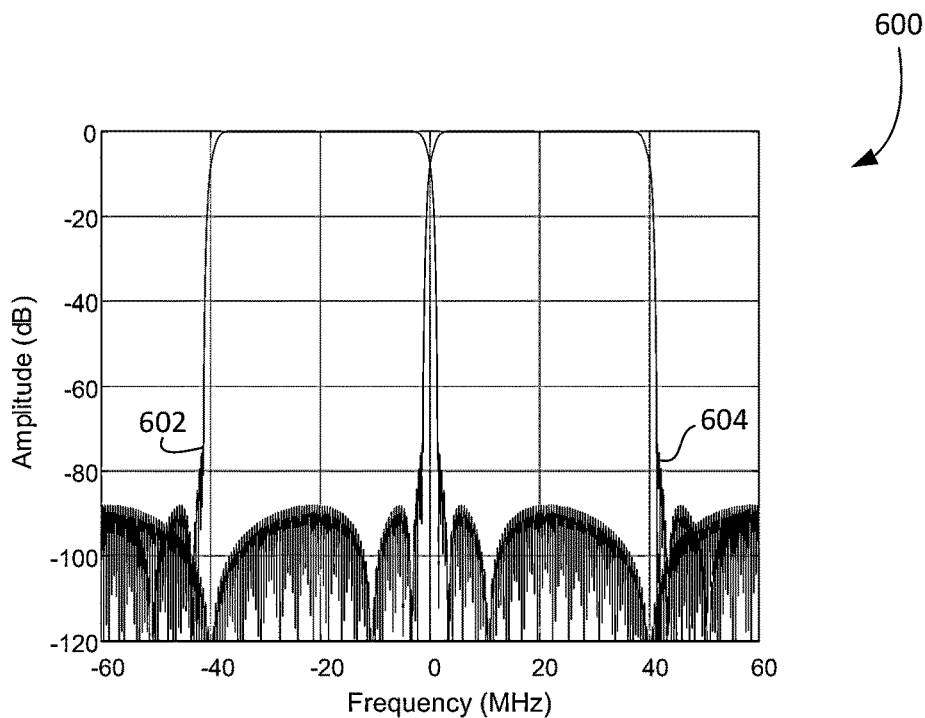
FIG. 6A shows an example graph of frequency responses for two adjacent channels.

FIG. 6A shows an example graph 600 of individual frequency responses for two adjacent channels. The graph 600 includes the uncompensated channel 1, CH1, frequency response measured individually through the IMUX and OMUX (i.e. through the transponder path of the payload) as indicated by numeral 602. The frequency response for channel 2, CH2, through the IMUX and OMUX is indicated by numeral 604. In the graph 600, 0 MHz corresponds to the center of the guard band between the two pass bands of respective channels CH1 and CH2. The center points of the respective channels are at −20 MHz and +20 MHz.

Figure 6B:
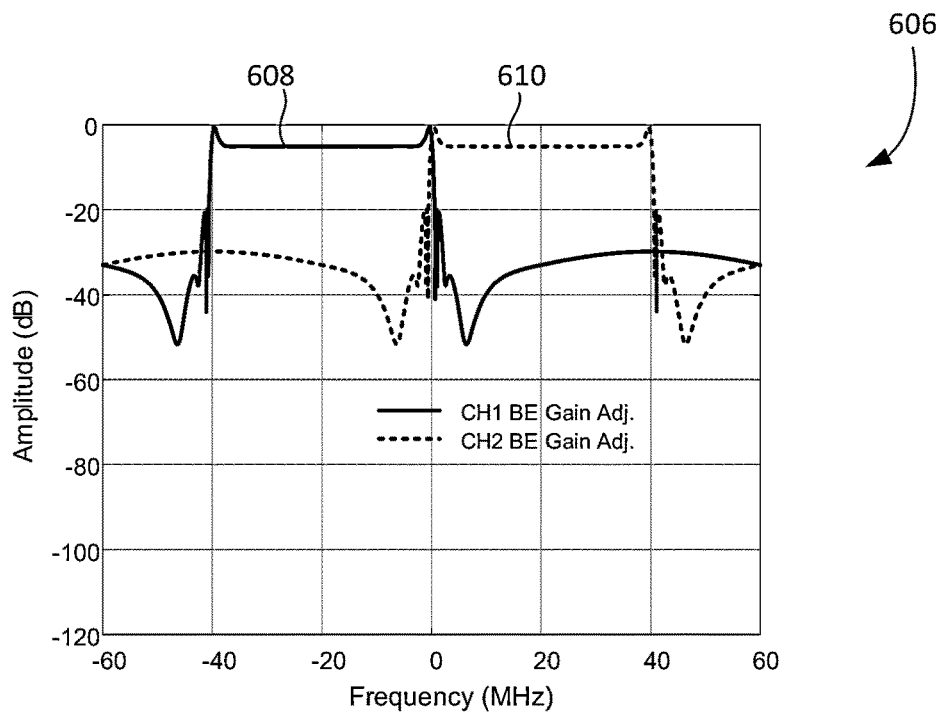
FIG. 6B shows an example graph of frequency responses of respective BE gain adjustment filter banks.

FIG. 6B shows an example graph 606 of frequency responses of respective BE gain adjustment filter banks. Numeral 608 indicates the synthesized frequency response of a BE gain adjustment filter bank for channel 1, and numeral 610 indicates the synthesized frequency response of a BE gain adjustment filter bank for channel 2.

Figure 6C:
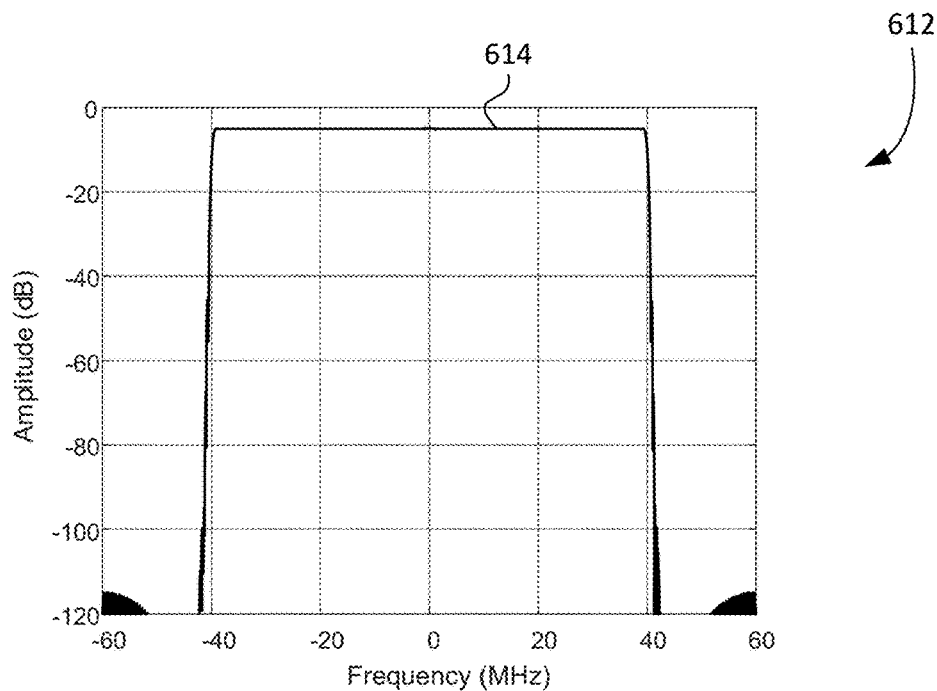
FIG. 6C shows a graph of the combined frequency response for the two adjacent channels with the BE gain adjustment filter banks.

FIG. 6C shows a graph 612 of the overall or combined frequency response 614 for the two adjacent channels with the BE gain adjustment filter banks in place. It will be noted that the gain across the two channels is substantially flat from the outer band edge of channel 1 at −40 MHz to the opposite outer band edge of channel 2 at +40 MHz. The guard band region is also substantially flat.

Figure 6D:
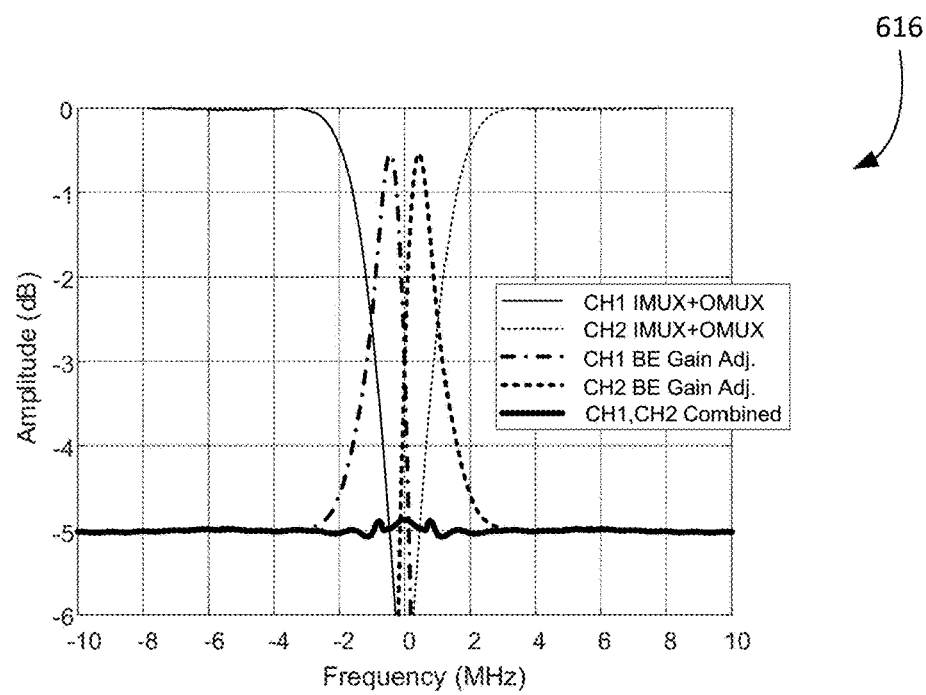
FIG. 6D shows an enlarged view of the frequency response of FIG. 6A, 6B and 6C in the guard band region.

FIG. 6D shows an enlarged view 616 of the frequency response 614 in the guard band region. The frequency responses 602, 604 of channel 1 and channel 2 without gain adjustment are shown, as is the synthesized frequency responses 608, 610 for channel 1 and channel 2's BE gain adjustment filters. It will be noted that the combined frequency response 614 in the guard band region exhibits a gain variation of less than 0.2 dB, which may be considered substantially flat.

It will also be appreciated that the gain adjustment filter banks introduce an insertion loss in the signal path. In this illustrative example, the insertion loss is about 5 dB. It may also be appreciated that most OMUX channel band-pass filter rejection roll-off crossover points in the guard band are less than 7dB, and the corresponding guard band "dent" seen at the OMUX output port is commonly less than 5 dB.

Nevertheless, since the introduced loss is not overly significant and is incurred at the payload transponder backend, it can be easily compensated without imposing noticeable noise degradation to the communication link.

The design of the BE gain adjustment filter, through determining suitable filter coefficients, may be carried out prior to satellite launch through testing of the frequency response of the transponder under simulated operating conditions. However, in real operation, the satellite payload undergoes temperature changes. In particular the body temperature of the OMUX channels in the output section of the payload can vary based on traffic load (e.g. HPA power levels driving input signals to the OMUX) and environmental conditions (e.g. day versus night with seasonal adjustments). The OMUX channel frequency response has been found to vary with temperature of the OMUX, since the OMUX channel filter is realized by metal resonant cavities that expand or contract based on temperature. Accordingly, the channel can undergo temperature-dependent frequency drift. Different channels may be affected differently dependent upon their physical characteristics.

Accordingly, in some aspects, the present application provides for the generation of multiple sets of transfer function coefficients for the BE gain adjustment filter for a given channel During operation, temperature of the OMUX or related components is determined and a corresponding set of transfer function coefficients is retrieved from memory and applied to configure to BE gain adjustment filter. The DCP may store two or more set of transfer function coefficients for each BE gain adjustment filter. Each set of transfer function coefficients may have a corresponding temperature range with which it is associated.

Figure 7:
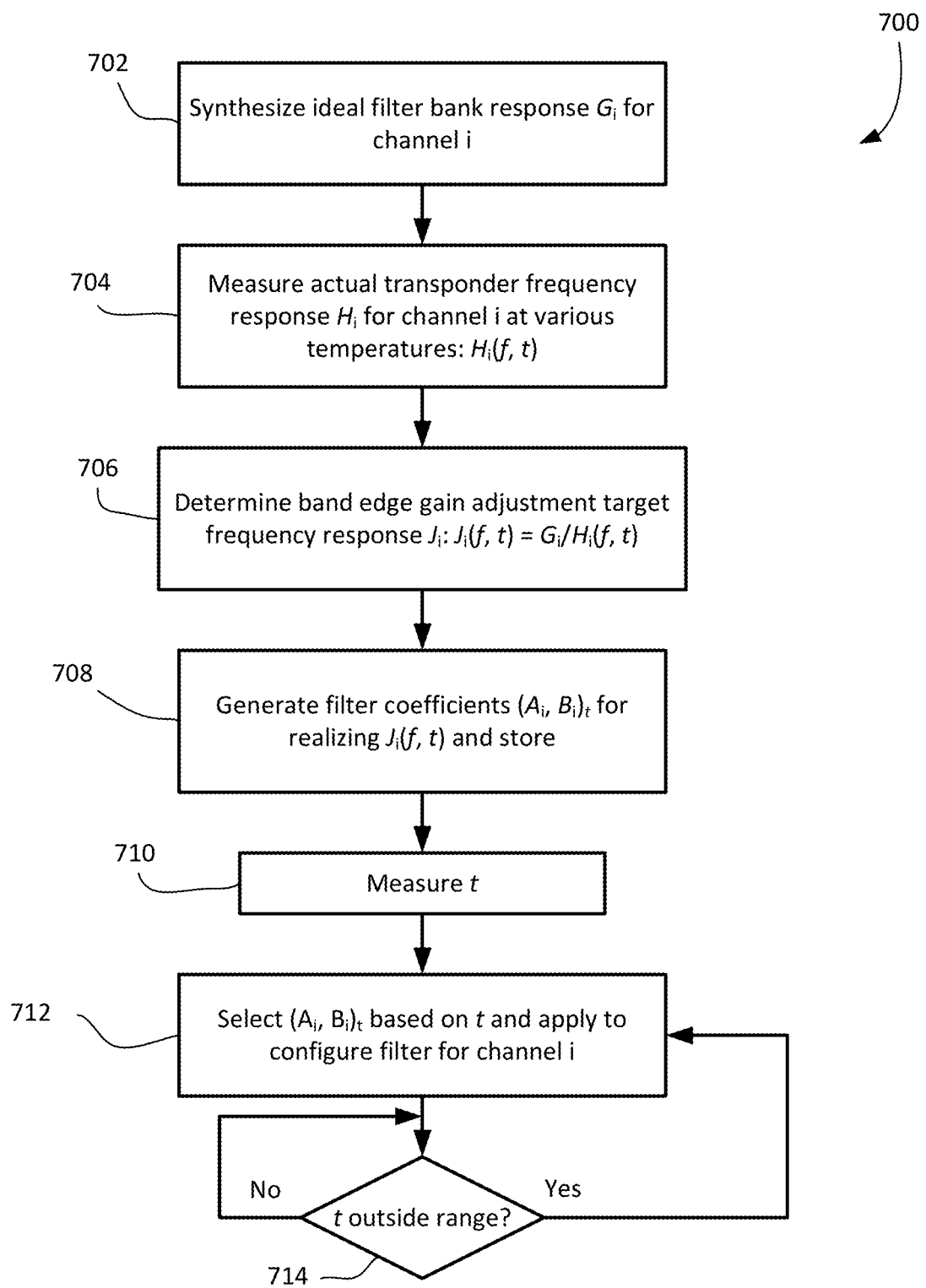
FIG. 7 shows, in flowchart form, on example method of flattening a channelized satellite payload frequency response across guard bands.

Reference will now be made to FIG. 7, which shows, in flowchart form, on example method 700 of flattening a channelized satellite payload frequency response across guard bands. The method 700 may have a portion carried out during a design implementation phase and portion that occurs during an operating phase. Some portions of the method, and in particular the operating phase, may be implemented by way of processor-executable code stored in memory and that, when executed, causes a processor to carry out the described operations. In some cases, portions of the method may be implemented by way of an application-specific-integrated-circuit (ASIC), field-programmable gate array (FPGA), or other dedicated hardware components having embedded therein the code operations for carrying out the described operations. Any other combination of software and/or hardware components for carrying out the described operations is also contemplated.

The desired response over the downlink spectrum at the OMUX output port is constant in terms of magnitude and group delay over the entire downlink frequency range, including the guard band between transponder channels. The desired response may be the sum of channels responses $G_i(f)$, for channels i=1, 2, 3, . . . , N. On the other hand, the actual channel response is defined by the IMUX+OMUX hardware channel performance $H_i$. Therefore, to realize an ideal filter bank channel performance $G_i$, the introduced BE gain adjustment network response, $J_i$, must satisfy $G_i(f)=H_i(f) \cdot J_i(f)$, or $J_i(f)=G_i(f)H_i(f)$. The corresponding BE gain adjustment filter (an IIR digital filter in this example) has transfer function numerator and denominator coefficients $[B_i, A_i]$. The filter coefficients may be generated using synthesis or optimization methods from the target response In operation 702, ideal filter bank (e.g. realized by minimum-phase FIR filters) is synthesized that matches the transponder frequency plan, i.e. the prescribed channel center frequencies and separations between channels. The synthesized ideal filter bank channel frequency response may be denoted $G_i(f)$, where i=1, 2, . . . N, and N is the total number of transponder channels.

In operation 704, the actual channel frequency response, i.e. the cascaded IMUX and OMUX channel response $H_i$, is measured. This response data may be measured during the payload ground manufacture and testing stage in some implementations. Several sets of response data for the same channel i can be measured or interpolated at different OMUX channel body temperature points. For example, at $t_1$ =10° C., $t_2$=40° C. and $t_3$ =70° C., and the applicable temperature ranges are t<20° C., 20° C.≤t<60° C. and t≥60° C. respectively. Thus the actual channel i response can also be written as $H_i(f, t)$ for the data measured at different temperatures t.

The BE again adjustment target frequency response $J_i$ is then determined based on $J_i(f,t)=G_i/H_i$, as indicated by operation 706. The corresponding filter coefficients $[B_i, A_i]_t$ for channel i are then generated in operation 708 for realizing the target frequency response $J_i$. Generation of the filter coefficients may be based on the type of filter being generated. In some cases, synthesis or optimization methods may be used to curve-fit the response $J_i$ for generating the filter coefficients. The generated filter coefficients for each channel i are stored in memory on the payload, such as within the DCP, and are stored in association with the temperature and/or temperature range for which they are applicable.

In operation, a measurement is made of the OMUX channel filter body temperature in operation 710. The payload may include one or more temperature sensors for providing temperature readings to the DCP. In some cases, each OMUX channel filter has a corresponding temperature sensor. In some cases, the DCP may receive a subset of temperature readings from different locations on each OMUX channel filter, and may interpolate the readings to determine temperature of each OMUX channel filter.

In operation 712, the DCP selects from memory the stored filter coefficients $[B_i, A_i]_t$ for channel i based on the measured temperature t for channel i. Those filter coefficients are then used to configure the corresponding BE gain adjustment filter for channel i.

The DCP continues to monitor temperature of the OMUX channel filters. If, in operation 714, it determines that the measured temperature of one or more of the OMUX channel filters is outside the temperature range of its currently configured filter coefficients, then it returns to operation 712 to select a different set of filter coefficients based on the new temperature range applicable to the current measured temperature.

It will be appreciated that operations 702-708 may be performed before launch and deployment of the satellite payload. Operations 710-714 are generally carried out during active operation of the satellite whilst in orbit. Advantageously, the DCP manages the configuration and any adjustment of the BE gain adjustment filters as indicated by operations 710-714, without requiring intervention or involvement of a ground control network.

It will further be appreciated that the measured actual frequency response of operation 704 includes all components, such as the narrowband components, in the transponder path up to the OMUX output port. For example, in some cases, an extra RF analog band-pass filter may be placed in the paths prior to the HPAs in some implementations. In some cases, the above-described measurements or determinations may exclude frequency conversions, analog-to-digital and digital-to-analog conversions, as they are generally wide-band frequency-invariant operations which do not impose noticeable distortions on individual channel performance In some implementations, the payload may feature a BE gain adjustment filter on each channel However, in some implementations, the payload may include a BE gain adjustment feature on a subset of channels.

Figure 8A:
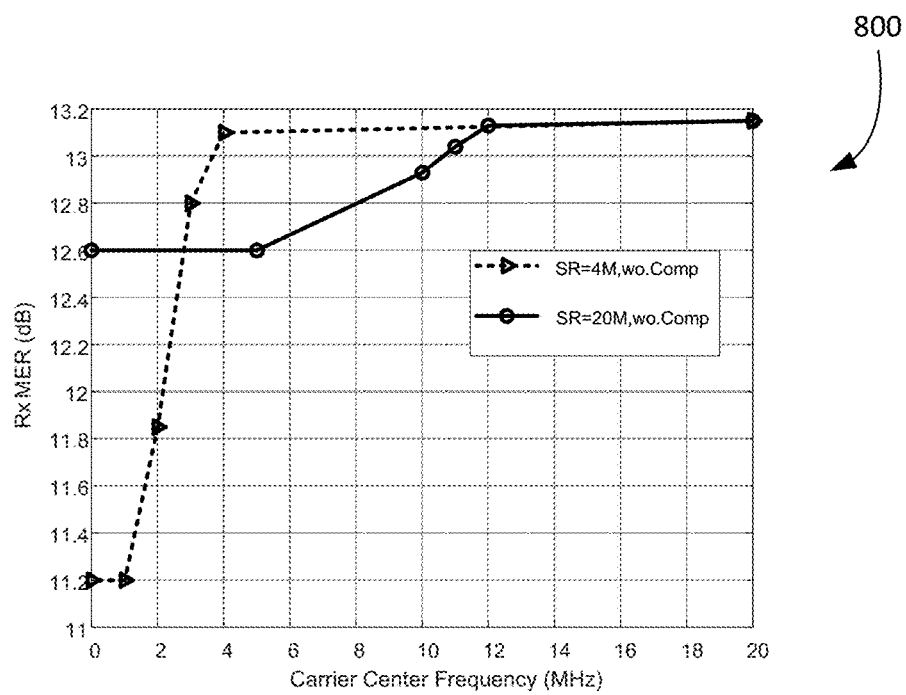
FIG. 8A shows a graph of receiver MER versus carrier frequency relative to the guard band center between two adjacent channels.

In testing, the BE gain adjustment filtering has shown a significant improvement in MER for carriers operating in or near the guard band. FIG. 8A shows a graph 800 of receiver MER versus carrier frequency without using BE gain adjustment filters. The carrier is swept from the guard band center at 0 MHz into the passband to the channel center frequency at 20 MHz. Two example carriers are used; one is a narrowband carrier and one is a wideband carrier. The narrowband carrier has a symbol rate (SR) of 4 Msps and the wideband carrier has a symbol rate of 20 Msps. The wideband carrier degrades less significantly since it loses less power in the guard band. It will be noted that the receiver MER for the narrowband carrier drops by about 2 dB in the guard band, while the MER for the wideband carrier drops by about 0.5 dB.

Figure 8B:
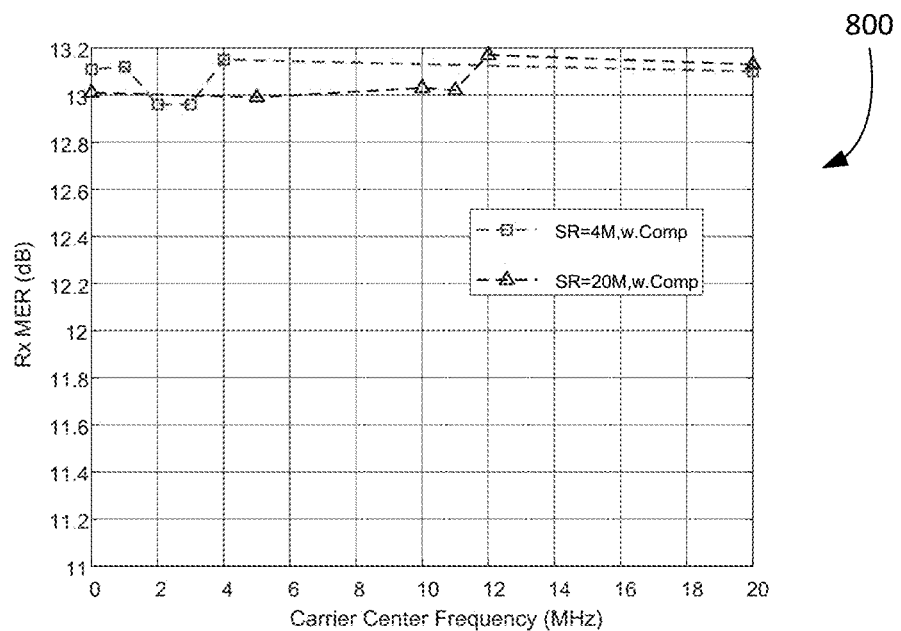
FIG. 8B shows a graph of receiver MER versus carrier frequency relative to the guard band center between two adjacent channels with the BE gain adjustment filter.

FIG. 8B shows a graph 800 of receiver MER versus carrier frequency with the BE gain adjustment filter in place. It will be appreciated that the drop in receiver MER is largely eliminate in both the narrowband and wideband cases. The compensated carrier MER variation from the channel center to the guard band center is within about 0.15 dB, which equates to a substantially flat performance across the full channel spectrum.

Further testing has shown that the guard band carrier maintains a reasonably constant performance despite adjacent carriers in the pass bands. There is some extra degradation if the HPAs are driven into the non-linear operating zone (saturation). Since this inter-modulation interference can be estimated in advance like the other conventional multi-carrier operation scenarios, the guard band carrier operation can also be reliably and efficiently managed as the other carrier operations. In some cases, the BE gain adjustment filter may have a set of filter coefficients configured to compensate for non-linearities introduced by HPA saturation. Accordingly, in some implementations, the DCP may be configured to select a set of filter coefficients based on temperature and based on whether the HPA is operating at its saturation point.

Band Edge Power Monitor

Figure 9:
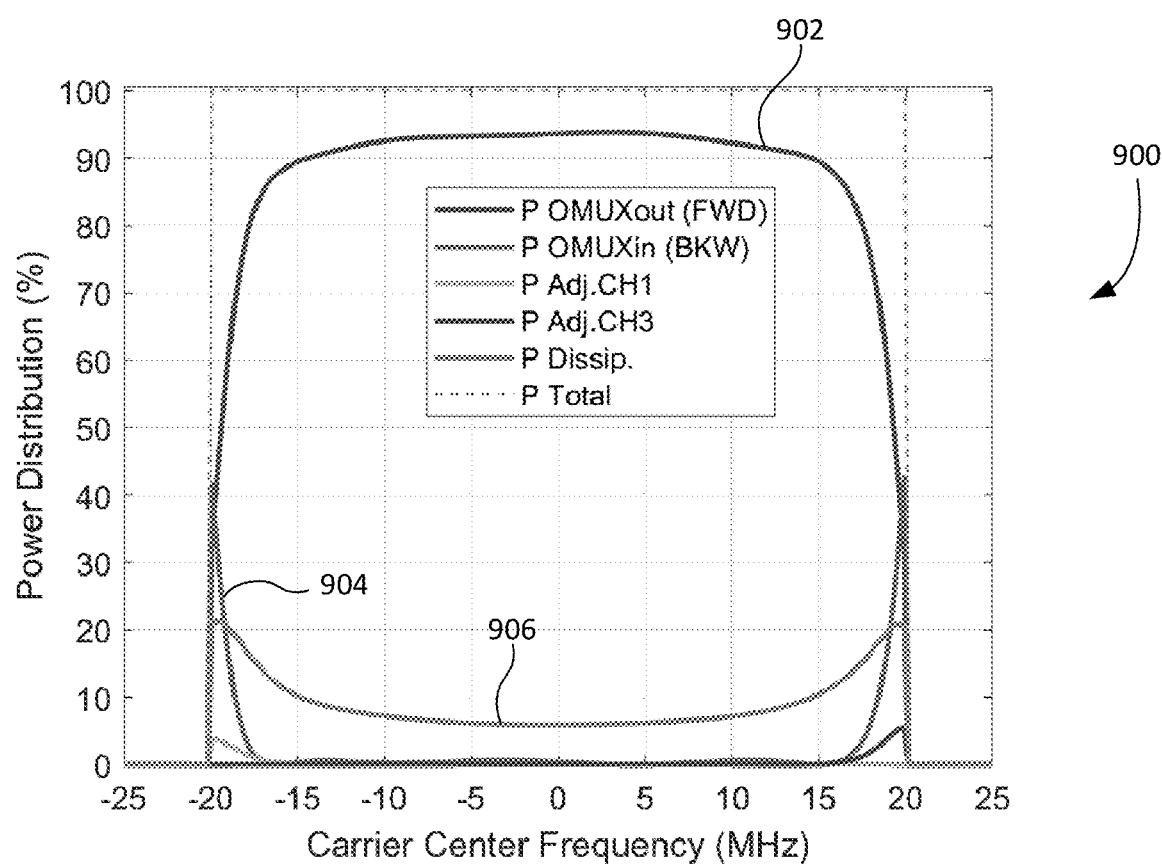
FIG. 9 shows a graph of power distribution versus carrier center frequency relative to the pass band center for an example transponder.

As discussed above, the highest risk from operating a satellite payload with guard band carriers are the power dissipation and power reflection problems that can cause damage to the HPA and OMUX components. To illustrate, FIG. 9 shows a graph 900 of power distribution versus carrier center frequency for an example transponder with a 40 MHz channel, having a 36 MHz pass band. The center frequency of the pass band is shown as 0 MHz on the graph 900. In this example, a narrowband carrier of 100 kHZ is swept form −20 MHz to +20 MHz. The example carrier is a flat rectangular waveform with a carrier power sufficient to drive the HPA to its maximum output power at the pass band center frequency.

Reference numeral 902 indicates the power transferred to the OMUX output. It will be noted that most of the power is transferred to the OMUX output through the passband, but that the portion of the carrier power appearing at the OMUX output at the band edges falls dramatically.

The power that is reflected from the OMUX input back towards the HPA is indicated by reference numeral 904. It will be noted that the reflected power peaks at over 40% with the carrier at the center of the guard band at −20 MHz or +20 MHz.

The graph 900 illustrates the dissipated power 906 absorbed by the OMUX.

It will be noted that this peaks at about 20% with the carrier at the center of the guard band.

Also shown in the graph 900 is some leaked power of a few percent that appears in the adjacent channels when the carrier is at or near the guard band centers.

Figure 10A:
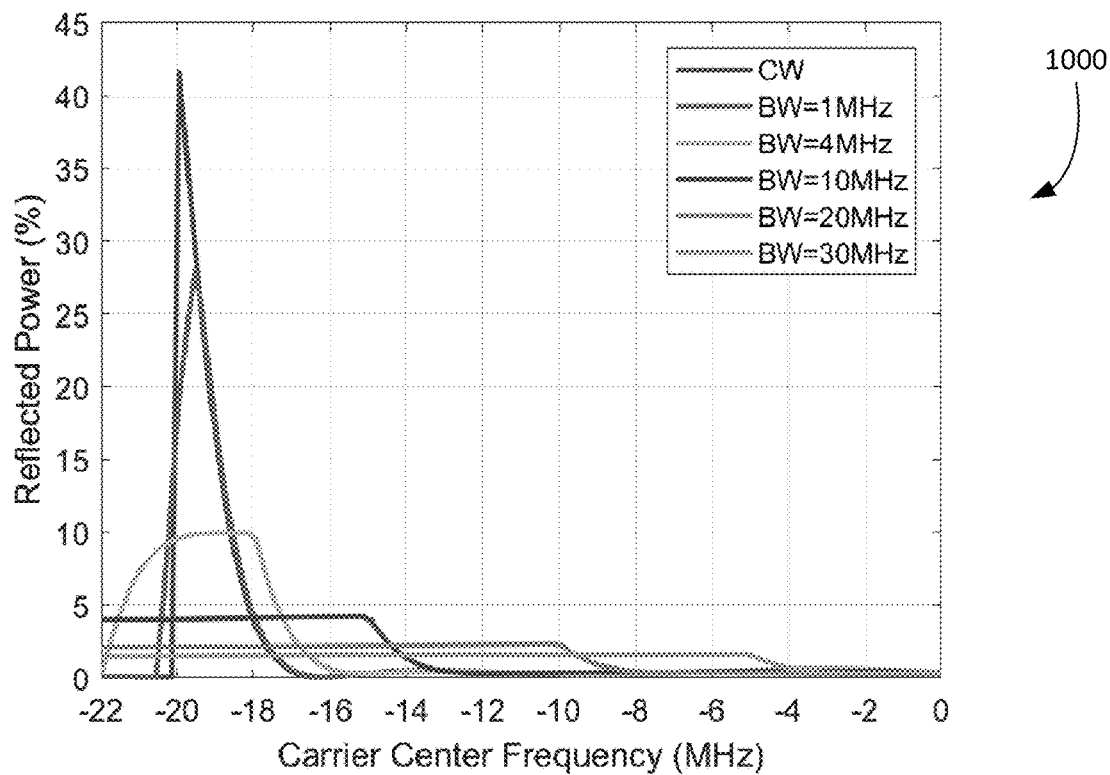
FIG. 10A shows a graph containing an example set of curves indicating reflected power versus carrier center frequency relative to the pass band center.

A wider band carrier, such as with a bandwidth of 4 MHz will exhibit a less pronounced reflection and dissipation. FIG. 10A shows a graph 1000 having a set of curves indicating the reflected power relative to the carrier center frequency. The frequency ranges from 0 at the center of the pass band to −20 at outer band edge, i.e. the center of the guard band. The highest peak occurs for the curve in which the carrier is a narrowband continuous wave (CW) carrier. Progressively smaller peaks correspond to progressively wider band carriers. Curves are shown for carriers having bandwidths of 1 MHz, 4 MHz, 10 MHz, 20 MHz, and 30 MHz.

Figure 10B:
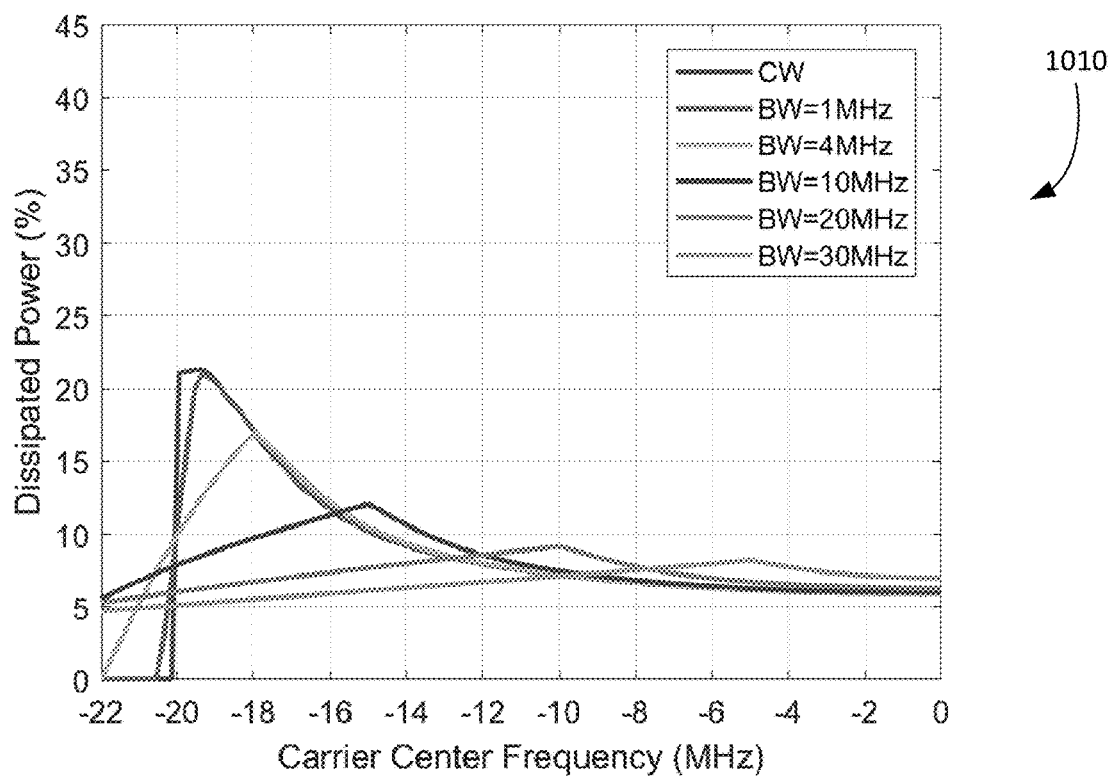
FIG. 10B shows a graph indicating dissipated power for carriers of varying bandwidths versus carrier center frequency relative to the pass band center.

FIG. 10B shows a graph 1010 indicating the dissipated power for carriers of varying bandwidths. The highest peaks occur for the curves in which the carrier is a continuous wave carrier or a 1 MHz bandwidth carrier.

Similar results are seen if modelled for two adjacent channels with a carrier swept from the center of one transponder channel to the center of the adjacent transponder channel Accordingly, when a carrier is operated in the guard band region, a high portion of the power will be dissipated or reflected, and this is normally considered as a fault condition. The dissipated power can increase OMUX body temperature which may even exceed the limits at a few hotspots and cause permanent damage to the OMUX hardware. The reflected power can go back to the HPA and can also cause serious hardware damage. Therefore, to support guard band carrier operation, the present application provides for a BE power monitor to ensure harmful dissipation and reflection power is properly handled and/or avoided.

The BE power monitor is designed to monitor the power spectral density (PSD) in the band edge region of a channel and to keep it below a threshold level. The threshold level, $PSD_{TH}$, may be set based on a qualified faulty operation high power PSD limit, $psd_Q$, in the guard band range: $psd_Q = p_Q/bw_q$. In this expression, $bw_q$ is the minimum carrier bandwidth used in the payload OMUX qualification test (e.g. 100 KHz for a quasi-CW carrier), and $p_Q$ is the maximum incident power to the OMUX input used in the qualification test. For a qualified OMUX design, its electrical, thermal and mechanical performances must meet the design specifications in the qualification test.

Figure 11:
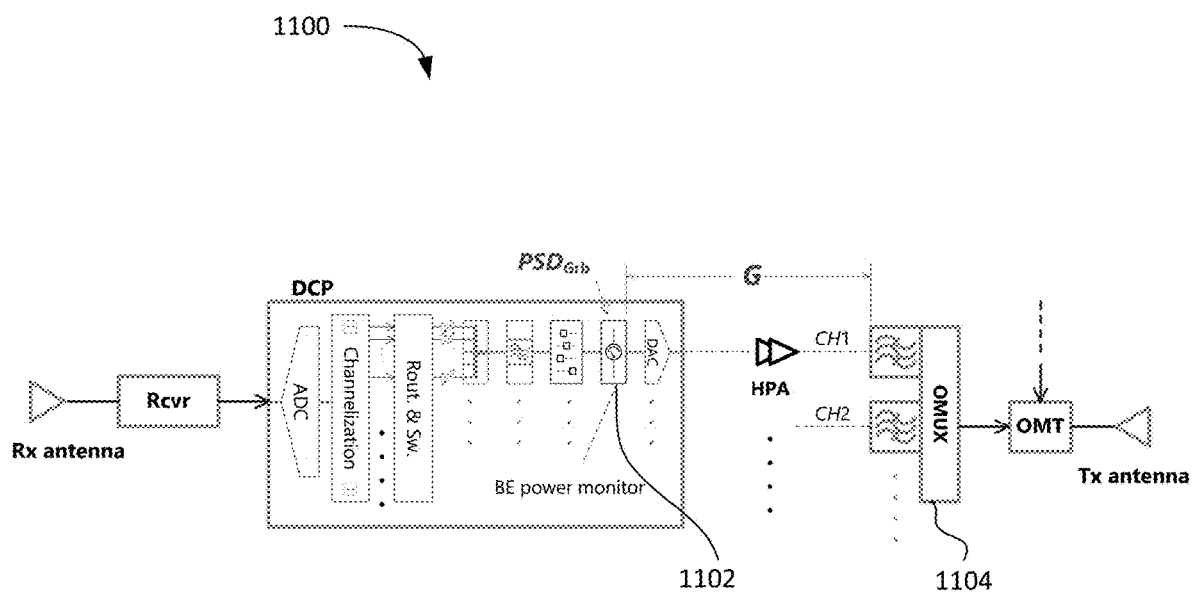
FIG. 11 shows an example satellite payload with gain G indicated between the output of a band edge power monitor module and the input to an OMUX.

There is a path gain, G, measured in dB scale, from the module output to the OMUX channel input. The value G can be different for different channels, which is contributed by the gains from DAC, frequency converters and HPA and the losses on the path, e.g. the cable loss, power dividing loss, switching loss, circulator loss etc. FIG. 11 shows an example satellite payload 1100 with gain G indicated between the output of a BE power monitor 1102 module and the input to an OMUX 1104.

The normal operating power spectral density may be given by $psd_{CH} = c_0 p_T/bw_{CH}$, where $p_T$ is the transponder HPA saturation power, $bw_{CH}$ is the transponder nominal bandwidth (e.g. 36 MHz for a typical C-band transponder) and co is a positive-valued coefficient that accounts for transponder OBO, operation margin as well as the coordinated PSD level agreed by the adjacent satellite operators.

A margin $M_1$ may be selected for operation tolerance, transponder path gain variation over frequencies and stability over temperatures.

The threshold level, $PSD_{TH}$, may then be set based on:

$$PSD_{CH} + M_1 < PSD_{TH} + G \ll PSD_Q,$$

Once $PSD_{TH}$ is set, the guard band carrier PSD or $PSD_{Grb}$ may be measured and controlled to ensure that:

$$PSD_{Grb} \leq PSD_{TH}$$

As an example, the transponder may be a typical C-band transponder, where: $PSD_{CH} = -56$ dBW/Hz, $PSD_Q = -30$ dBW/Hz, G=80 dB and $M_1 = 6$ dB, then $PSD_{TH} + G = -50$ dBW/Hz («$PSD_Q$), or $PSD_{TH} = -130$ dBW/Hz. That is, if the transponder HPA max output power is 100 W, then the BE power monitor caps $PSD_{Grb}$ to $PSD_{TH}$, and HPA power up to $p_{Grb} = psd_{TH} \cdot g \cdot bw_{Grb} = 10^{-50/10} \cdot 4 \times 10^6 = 40$ W is allowed to apply to the 4 MHz OMUX guard band range, where g is the path gain (G) in linear scale. Based on modeling, the 40 W RF incident power to the OMUX input, 22.5 W (56%) will be transmitted to the OMUX output, and about 10 W (25%) and 7.5 W (19%) power will be reflected back to HPA and dissipated on OMUX, respectively, leaving sufficient margin to the safety operation power limit.

Figure 12:
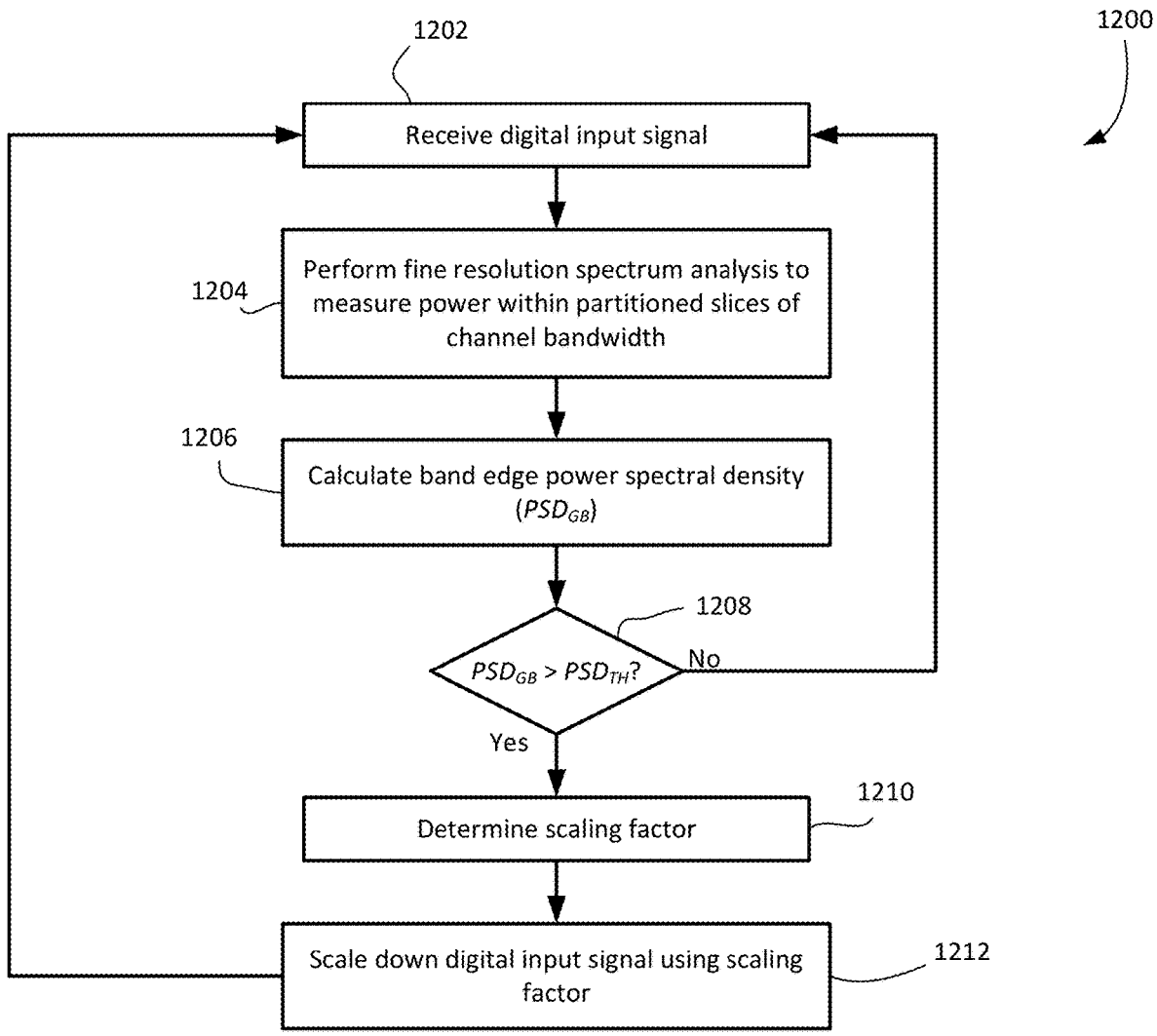
FIG. 12 shows, in flowchart form, one example method of protecting a satellite payload from damage.

FIG. 12 shows, in flowchart form, one example method 1200 of protecting a satellite payload from damage. In this example, the method 1200 may be implemented by way of processor-executable code stored in memory and that, when executed, causes a processor to carry out the described operations. In some cases, portions of the method may be implemented by way of an application-specific-integrated-circuit (ASIC), field-programmable gate array (FPGA), or other dedicated hardware components having embedded therein the code operations for carrying out the described operations. Any other combination of software and/or hardware components for carrying out the described operations is also contemplated. In some implementations, the method 1200 is implemented wholly or partly within the DCP.

The method 1200 includes receiving a digital input signal in operation 1202. As shown in FIG. 11, the BE power monitor 1102, receives a digital input signal from an IMUX bandpass filter. In some cases, the payload may include a BE gain adjustment filter after the IMUX and prior to the BE power monitor 1102. The input digital signal received in operation 1202 is channelized such that the input digital spectrum spans the channel bandwidth. In some examples, the bandwidth is 40 MHZ and includes a 36 MHz pass band and 2 MHz band ends that serve as guard bands. In this example, one or both of the band ends may contain carrier signals intended for transmission in the guard bands.

In operation 1204, the BE power monitor 1102 perform spectrum analysis on the input digital signal. In particular, it may perform a fine spectrum analysis to measure the power within a series of fine resolution bands (RB) of the channel bandwidth. In some examples, those resolution bandwidths (RBWs) are $1/100^{th}$, $1/200^{th}$, $1/400^{th}$ or smaller portions of the channel bandwidth. Whereas subchannels are typically a few MHz, and occasionally as small as hundreds of kHz, a resolution band for fine spectrum analysis may be as small as tens of Hz.

Having determined the power attributable to each resolution band of channel bandwidth, the BE power monitor 1102 then, in operation 1206, determines the power spectral density within the guard band, i.e. with the two band ends. This may include integrating and averaging the RF power within the resolution bands that make up the band ends of the channel. This determination provides the guard band power spectral density or $\text{psd}_{GB}$.

In operation 1208, the BE power monitor assesses whether the measured guard band power spectral density exceeds a threshold level power spectral density associated with the channel As described above, the threshold level may be determined partly based on a qualified faulty operation power spectral density limit set by the manufacture or determined during initial testing or design, and partly based on a gain value for the channel path to the OMUX and a safety margin, $M_1$, selected for the channel. If the guard band power spectral density, $\text{psd}_{GB}$, does not exceed the threshold level, $\text{psd}_{TH}$, then the BE power monitor does not need to take action, it passes the input signal through along the channel path to the DAC and HPAs, and it continues to monitor the power level in the input signal.

If, however, the guard band power spectral density, $\text{psd}_{GB}$, does exceed the threshold level, $\text{psd}_{TH}$, then the BE power monitor scales down the signal in the guard band to ensure that the power spectral density is at or below the threshold level before it is output to the remainder of the channel path. In this example, that may include determining a scaling factor by which the signal is to be downscaled in the digital domain, as indicated by operation 1210. In one example, this may include determining the scaling factor as $\text{psd}_{GB}/\text{psd}_{TH}$. The scaling factor is used, in operation 1212, to downscale the signal strength in the guard band portion of the channel spectrum, i.e. the band edge regions. The downscaling may include dividing the guard band signal by the scaling factor. Equivalently, the guard band signal may be multiplied by a scaling factor determined as $\text{psd}_{TH}/\text{psd}_{GB}$. Irrespective of how it is determined and applied, the scaling factor results in decreasing the signal strength of signals in the guard band region sufficiently to ensure that the power spectral density in the guard band region stays at or below the threshold level. The BE power monitor thus effectively caps the power spectral density in the guard band region at the threshold level.

In this manner, the method 1200 may enable the user of the guard band region for transmission of carrier traffic without the associated risk of hardware damage to the satellite payload. In some cases, the BE power monitor may be used together with the BE gain adjustment filter to ensure MER performance of carriers in the guard band region is not markedly different from MER performance of carriers in the pass band region.

Example embodiments of the present disclosure are not limited to any particular type of satellite or antenna.

The various embodiments presented above are merely examples and are in no way meant to limit the scope of this application. Variations of the innovations described herein will be apparent to persons of ordinary skill in the art, such variations being within the intended scope of the present application. Additionally, the subject matter described herein and in the recited claims intends to cover and embrace all suitable changes in technology.

The invention claimed is:

1. A satellite payload, the satellite payload comprising:
a receive antenna to receive an uplink band of spectrum;
a digital channelizing processor to digitize the uplink band of spectrum to produce a digitized band of spectrum, to channelize the digitized band of spectrum into a plurality of subchannels, to switch and route the subchannels, to select, combine and filter the subchannels to form a plurality of individual channels using a digital input demultiplexer, and to output analog channels;
a high-power amplifier for each of the analog channels to generate amplified channels;
an output multiplexer that includes, for each amplified channel, an output multiplexer channel filter having a channel bandwidth that includes a pass band and a band edge on either side of the pass band, whereby adjacent band edges of adjacent channels form a guard band between the pass bands of those adjacent channels, the output multiplexer outputting a downlink band of spectrum; and
a transmit antenna to transmit the downlink band of spectrum,
wherein the digital channelizing processor includes, for each of at least one of the plurality of channels,
a band edge power monitor to measure power spectral density in the band edges of that channel and to scale down signal amplitude within the band edges when the measured power spectral density in the band edges exceeds a threshold level power spectral density.

2. The satellite payload of claim 1, wherein the band edge power monitor is further to partition the digitized band of spectrum within that channel into a plurality of resolution bands of the channel bandwidth, measure power in each of the resolution bands of the channel bandwidth, and determine power spectral density in the band edges based on the measured power in the resolution bands of the channel bandwidth in the band edges.

3. The satellite payload of claim 2, wherein the band edge power monitor is to determine power spectral density in the band edges by integrating and averaging the measured power in the resolution bands of the channel bandwidth in the band edges.

4. The satellite payload of claim 1, wherein the digital channelizing processor further includes a memory storing the threshold level power spectral density.

5. The satellite payload of claim 1, wherein the band edge power monitor is to scale down signal amplitude by determining a scaling factor and using the scaling factor to scale the signal amplitude in a digital domain.

6. The satellite payload of claim 5, wherein the band edge power monitor is to determine the scaling factor based on a ratio of power spectral density in the band edges to the threshold level power spectral density.

7. The satellite payload of claim 1, wherein the digital channelizing processor further includes, for the each of at least one of the channels, a band edge gain adjustment filter having a frequency response configured to compensate for a frequency response of a channel path through the input demultiplexer, high-power amplifier and the output multiplexer on that channel, such that an output frequency response across the adjacent channels is substantially flat.

8. The satellite payload of claim 7, wherein the output multiplexer further includes one or more temperature sensors coupled to the digital channelizing processor to provide a temperature signal representing output multiplexer channel filter temperature, and wherein the digital channelizing processor is configured to select, for each of at least one of the channels, based on the temperature signal, a respective set of filter coefficients from among two or more respective sets of stored filter coefficients for that channel, and to configure the band edge gain adjustment filter for that channel using the selected respective set of filter coefficients.

9. The satellite payload of claim 7, wherein the output multiplexer further includes one or more temperature sensors coupled to the digital channelizing processor to provide a temperature signal representing output multiplexer channel filter temperature, and wherein the digital channelizing processor is configured to compare the temperature signal to a temperature range associated with a current set of filter coefficients used by the band edge adjustment filter and, when the temperature signal is outside the temperature range, to select and apply a different set of filter coefficients associated with the channel.

10. The satellite payload of claim 7, wherein the digital channelizing processor includes a memory storing current filter coefficients for realizing the frequency response and wherein the digital channelizing processor is configured to retrieve the current filter coefficients and to use them to generate the band edge adjustment filter.

11. A method of managing satellite communications, comprising:
receiving an uplink band of spectrum at a satellite payload;
digitizing the uplink band of spectrum to produce a digitized band of spectrum;
channelizing the digitized band of spectrum into a plurality of subchannels using a digital channelizer;
routing and switching the subchannels;
selecting, combining and filtering the subchannels to form a plurality of individual channels using a digital input demultiplexer;
converting the plurality of channels into analog channels;
amplifying each of the analog channels using a respective high-power amplifier to generate amplified channels;
multiplexing the amplified channels to produce a downlink band of spectrum using an output multiplexer that includes, for each channel, an output multiplexer channel filter having a channel bandwidth that includes a pass band and a band edge on either side of the pass band, whereby adjacent band edges of adjacent channels form a guard band between the pass bands of those adjacent channels;
transmitting the downlink band of spectrum to an earth station; and
after the channelizing and prior to the converting, for at least one of the channels, measuring power spectral density in the band edges of that channel and scaling down signal amplitude within the band edges when the measured power spectral density in the band edges exceeds a threshold level power spectral density.

12. The method of claim 11, wherein measuring includes partitioning the digitized band of spectrum within that channel into a plurality of resolution bands of the channel bandwidth, measure power in each of the resolution bands of the channel bandwidth, and determine power spectral density in the band edges based on the measured power in the resolution bands of the channel bandwidth in the band edges.

13. The method of claim 12, wherein determining power spectral density in the band edges includes integrating and averaging the measured power in the resolution bands of the channel bandwidth in the band edges.

14. The method of claim 11, further comprising first determining the threshold level power spectral density based on a qualified faulty operation high power spectral density limit in a guard band range, a path gain between a band edge power monitor and an output multiplexer channel filter input, and a margin value.

15. The method of claim 11, wherein scaling down signal amplitude includes determining a scaling factor and using the scaling factor to scale the signal amplitude in a digital domain.

16. The method of claim 15, wherein determining the scaling factor includes determining the scaling factor from a ratio of power spectral density in the band edges to the threshold level power spectral density.

17. The method of claim 11, further comprising, for the each of at least one of the plurality of channels, filtering that channel using a band edge gain adjustment filter having a frequency response configured to compensate for a frequency response of a channel path through the input demultiplexer, high-power amplifier and the output multiplexer on that channel, such that an output frequency response across the adjacent channels is substantially flat.

18. The method of claim 17, wherein the output multiplexer further includes one or more temperature sensors coupled to the digital channelizing processor, and wherein the method further includes obtaining a temperature signal representing output multiplexer channel filter temperature, and selecting, for each of at least one of the plurality of channels, based on the temperature signal, a respective set of filter coefficients from among two or more respective sets of stored filter coefficients for that channel, and configuring the band edge gain adjustment filter for that channel using the selected respective set of filter coefficients.

19. The method of claim 17, wherein the output multiplexer further includes one or more temperature sensors coupled to the digital channelizing processor, and wherein the method further includes obtaining a temperature signal representing output multiplexer channel filter temperature, comparing the temperature signal to a temperature range associated with a current set of filter coefficients used by the band edge adjustment filter and, when the temperature signal is outside the temperature range, selecting and applying a different set of filter coefficients associated with the channel.

20. The method of claim 17, further comprising initially storing current filter coefficients for realizing the frequency response, retrieving the current filter coefficients, and using the current filter coefficients to generate the band edge adjustment filter.

* * * * *